P. C. MOORE.
CORN-STALK KNIFE.

No. 171,303. Patented Dec. 21, 1875.

WITNESSES.
A. F. Cornell
James Whright

INVENTOR.
P. C. Moore
Per Burridge & Co.
Attys.

UNITED STATES PATENT OFFICE.

PETER C. MOORE, OF LA FAYETTE, OHIO.

IMPROVEMENT IN CORN-STALK KNIVES.

Specification forming part of Letters Patent No. 171,303, dated December 21, 1875; application filed November 8, 1875.

*To all whom it may concern:*

Be it known that I, PETER C. MOORE, of La Fayette, in the county of Medina and State of Ohio, have invented new and useful Improvement in Corn-Cutters, of which the following is a description, reference being had to the accompanying drawings, making a part of this specification, in which—

Figure 1:
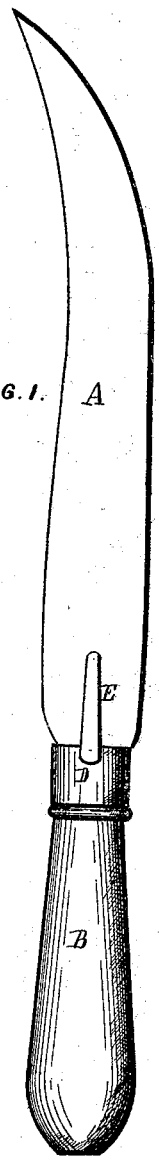
Figure 2:
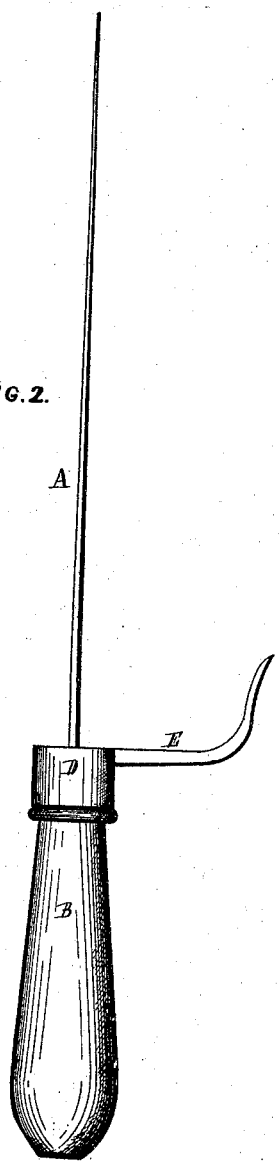
Figure 3:
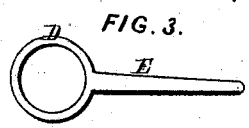

Figure 1 is a side view of the cutter or knife. Fig. 2 is an edge view. Fig. 3 is a detached section.

Like letters of reference refer to like parts in the several views.

The nature of this invention relates to a knife or cutter for cutting up standing corn; and the invention consists in providing said knife with a guard to protect the hand holding the knife from being chafed by the stalks, and to assist the same in holding the severed stalks while being carried and stood up in the shock. The following is a description of the cutter and the mode of using the same:

A, in the drawings, represents a side view of the knife, or blade thereof, and B the handle, the particular shape of which is not essential; hence it may be of the shape shown, or a modification thereof. D is the ferrule, from the side of which projects the guard E, above alluded to. Said guard projects at right angle to the side of the blade, the extreme end of which curves upward and slightly outward, as shown in the drawing, forming a kind of hook or shoulder to the handle, a detached view of which is shown in Fig. 3.

In cutting standing corn for shocking, a straight-bladed cutter is ordinarily used, the right hand holding it, while the left is employed in gathering together the stalks in the hills, and holding them while being cut off. In this work of the left hand (gathering the stocks) the right hand assists as much as it can by extending the thumb, which, together with the knife, aids in gathering the stalks together into the left hand, to be held thereby while being cut off by the right hand.

In practice, the thumb becomes chafed and strained by the stalks, (hence, painful to be used,) to avoid which is the purpose of the guard E, which relieves the thumb from assisting in gathering the stalks for the left hand to hold.

The cutter is used in the ordinary way, and when held in the right hand the guard will both relieve and protect the thumb, which will remain with the fingers clasping the handle, while the guard, instead of the thumb, assists in gathering the stalks.

The position of the guard in respect to the knife, as shown in the drawing, is such as when used by a right-handed person; for a left-handed one, the guard can be changed to the opposite side of the knife, by turning the ferrule.

What I claim as my invention, and desire to secure by Letters Patent, is—

The guard E, in combination with the knife A and handle B, substantially in the manner as described, and for the purpose set forth.

PETER C. MOORE.

Witnesses:
W. S. BURRIDGE,
E. S. POPE.